US012589815B2

(12) United States Patent
Schroeder et al.

(10) Patent No.: US 12,589,815 B2
(45) Date of Patent: Mar. 31, 2026

(54) MULTIFUNCTIONAL VEHICLE STORAGE COMPARTMENT DOOR

(71) Applicants: David Paul Schroeder, Dunbarton, NH (US); Richard Edwin Schroeder, Temple, TX (US)

(72) Inventors: David Paul Schroeder, Dunbarton, NH (US); Richard Edwin Schroeder, Temple, TX (US)

( * ) Notice: Subject to any disclaimer, the term of this patent is extended or adjusted under 35 U.S.C. 154(b) by 320 days.

(21) Appl. No.: 18/300,995

(22) Filed: Apr. 14, 2023

(65) Prior Publication Data

US 2023/0331315 A1 Oct. 19, 2023

Related U.S. Application Data

(60) Provisional application No. 63/362,983, filed on Apr. 14, 2022.

(51) Int. Cl.
B62D 33/027 (2006.01)
E06B 3/26 (2006.01)

(52) U.S. Cl.
CPC ............ B62D 33/0273 (2013.01); E06B 3/26 (2013.01); E05Y 2900/544 (2013.01)

(58) Field of Classification Search
CPC .. B62D 33/0273; B62D 33/027; B62D 33/03; B62D 33/037; E05Y 2900/544; E05Y 2900/546
USPC ............................................ 296/57.1, 50, 51
See application file for complete search history.

(56) References Cited

U.S. PATENT DOCUMENTS

| | | | | |
|---|---|---|---|---|
| 4,889,372 A * | 12/1989 | Dege | ..................... | E05C 17/365 |
| | | | | 292/264 |
| 8,246,098 B2 * | 8/2012 | Cheung | .............. | B62D 33/0273 |
| | | | | 296/146.12 |
| 8,740,279 B1 * | 6/2014 | McGoff | ............. | B62D 33/0273 |
| | | | | 49/168 |
| 9,994,263 B1 * | 6/2018 | Richter | .................. | B60P 1/435 |
| 10,308,291 B2 * | 6/2019 | Seki | ........................ | B62D 33/03 |
| 2004/0174035 A1 * | 9/2004 | Acker | ................ | B62D 33/0273 |
| | | | | 296/57.1 |
| 2007/0222258 A1 * | 9/2007 | Bacco | ...................... | B60J 5/108 |
| | | | | 296/182.1 |

(Continued)

*Primary Examiner* — Roger L Pang

(57) ABSTRACT

An apparatus for enclosing a storage area of a vehicle is described. A first door encloses a first portion of one side of the storage area. A second door encloses a second portion of the one side of the storage area. A first pair of hinges is associated with the first door. Each of the first pair of hinges are located at opposite ends of a first edge of the first door and enable the first door to move between an open position and a closed position with respect to the first portion of the storage area. A second pair of hinges is associated with the second door. Each of the second pair of hinges are located at opposite ends of a first edge of the second door and enable the second door to move between an open position and a closed position with respect to the second portion of the storage area. A first pair of latches associated with the first door latch the first door into the closed position. A second pair of latches associated with the second door latch the second door into the closed position. A first latching lever releases the first pair of latches latching the first door into the closed position and a second latching lever releases the second pair of latches latching the second door into the closed position.

11 Claims, 11 Drawing Sheets

(56)            References Cited

U.S. PATENT DOCUMENTS

2012/0126564 A1*   5/2012   Hausler ............. B62D 33/0273
                                              296/57.1
2012/0324793 A1*  12/2012   Abbasi .............. B62D 33/0273
                                              49/168

* cited by examiner

MULTIFUNCTIONAL VEHICLE STORAGE COMPARTMENT DOOR

CROSS-REFERENCE TO RELATED APPLICATIONS

This application claims benefit of U.S. Provisional Application No. 63/362,983, filed Apr. 14, 2022, entitled MULTIFUNCTIONAL VEHICLE STORAGE COMPARTMENT DOOR, the specification of which is incorporated by reference herein in its entirety.

TECHNICAL FIELD

This application relates to tailgates, and more particularly, to tailgates having multiple door configurations.

BACKGROUND

Tailgate enclosures are utilized on a variety of vehicles such as pickups, SUVs, hatchbacks, etc. Tailgate or hatchback enclosures normally comprise a single door that pivots between open and closed positions along an edge of the tailgate or hatchback. Since a tailgate or hatchback normally only comprises a single door that may move between an open position and a closed position, the entire bed or back area enclosed by the tailgate or hatchback can thus only be used in two configurations. Thus, there is a need to increase the versatility of tailgates or hatchbacks to allow for carrying longer cargo without leaving the entire tailgate or hatchback opened.

SUMMARY

The present invention, as disclosed and described herein, in one aspect thereof comprises an apparatus for enclosing a storage area of a vehicle is described. A first door encloses a first portion of one side of the storage area. A second door encloses a second portion of the one side of the storage area. A first pair of hinges is associated with the first door. Each of the first pair of hinges are located at opposite ends of a first edge of the first door and enable the first door to move between an open position and a closed position with respect to the first portion of the storage area. A second pair of hinges is associated with the second door. Each of the second pair of hinges are located at opposite ends of a first edge of the second door and enable the second door to move between an open position and a closed position with respect to the second portion of the storage area. A first pair of latches associated with the first door latch the first door into the closed position. A second pair of latches associated with the second door latch the second door into the closed position. A first latching lever releases the first pair of latches latching the first door into the closed position and a second latching lever releases the second pair of latches latching the second door into the closed position.

BRIEF DESCRIPTION OF THE DRAWINGS

For a more complete understanding, reference is now made to the following description taken in conjunction with the accompanying Drawings in which.

DETAILED DESCRIPTION

Figure 1:
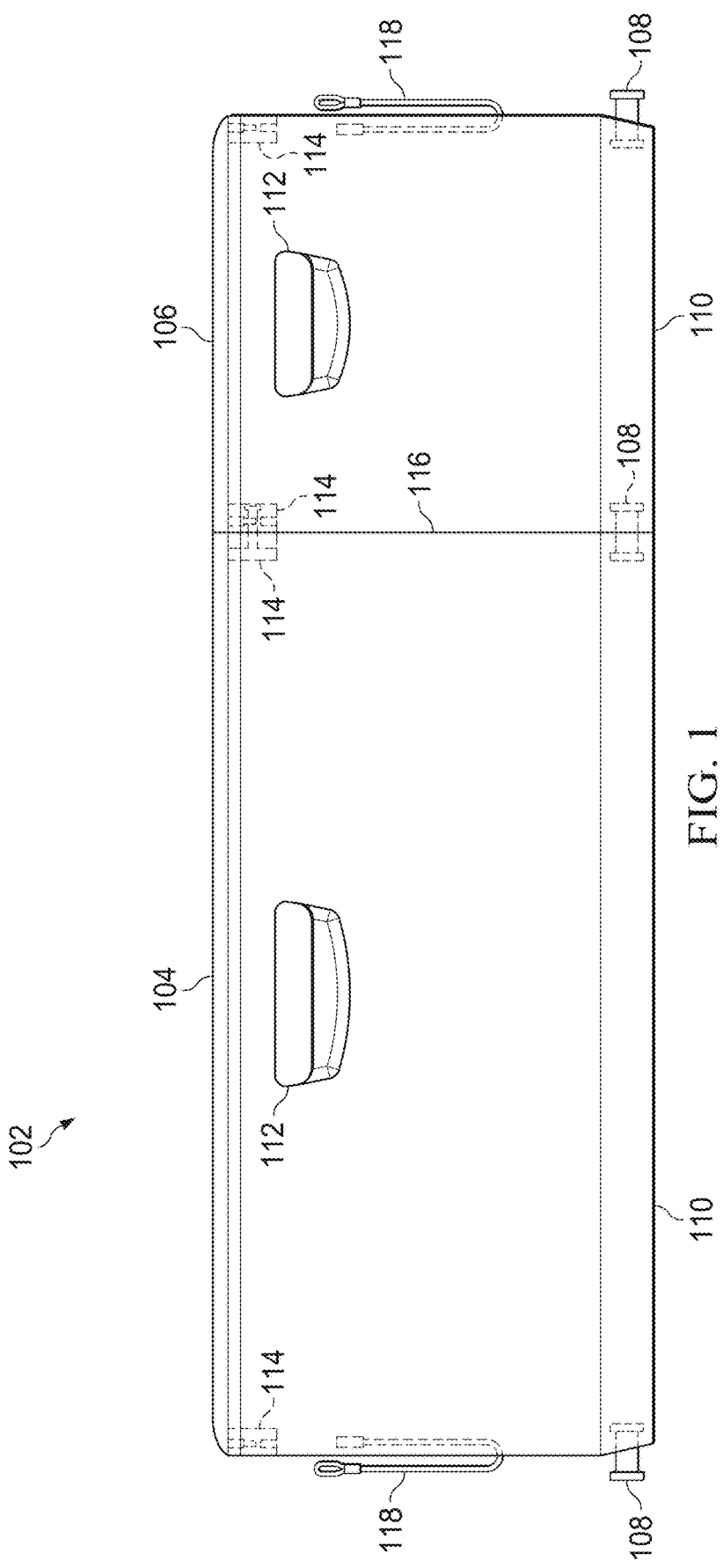
FIG. 1 illustrates a block diagram of a first embodiment of a multifunction vehicle storage compartment door.

Referring now to the drawings, wherein like reference numbers are used herein to designate like elements throughout, the various views and embodiments of a multifunctional vehicle storage compartment door are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

The mechanism described herein utilizes a tailgate incorporating one or more opening doors therein in a variety of possible configurations. The particular mechanism utilized with respect to a particular tailgate can be selected by a tailgate designer utilizing the various configurations described herein. The apparatus described herein below may utilize standard latching and opening mechanisms that are currently available with tailgates. The hinge assemblies utilized for opening and closing the door may also comprise standard parts. Currently available hinge assemblies for all sections of tailgate actuation could be utilized in the various configurations described herein. While the discussion herein below is made with respect to tailgates, the apparatus is equally applicable to hatchback and other vehicles having an enclosed storage compartment.

Referring now to the drawings, and more particularly to FIG. 1, there is illustrated a block diagram of a first embodiment of a multifunctional vehicle storage compartment door wherein the tailgate assembly 102 is designed to include two separate opening portions of the tailgate assembly. A first door 104 comprises a largest portion of the tailgate assembly 102 and the second door 106 comprises a smaller portion of the tailgate assembly. The first door 104 and the second door 106 are connected to the vehicle body via hinge assemblies 108. The hinge assemblies 108 enable the first door 104 and the second door 106 to pivot along their edges 110 between the closed position and the open position. The tailgate assembly 102 further includes latch levers 112 for unlatching the first door 104 and the second door 106 from being latched into the closed position. Latching mechanisms 114 are actuated by the latch lever 112 to unlock the tailgate doors from being held in the latched, closed position.

FIG. 1 illustrates a split tailgate assembly wherein the first door 104 and second door 106 open and close independently or wherein each of the first door 104 and second door 106 opens and closes together as a single full-size tailgate assembly. This design allows the user to carry "tall" items which extend beyond the walls of the bed of the vehicle while keeping a portion of the bed closed to contain items therein. This configuration prevents items from falling out of the back of the bed of the vehicle (in the case where the entire tailgate was down) while the vehicle is in motion.

A pair of tailgate latch levers 112 is used for actuating the locking latches 114 and striker bolts for locking the first door 104 and the second door 106 into the closed position. The first pair of locking latches 114 is used with the first door 104 and the second pair of locking latches 114 are used with the second door 106. The tailgate seam 116 has two latching mechanisms 114 associated therewith and enables interfacing of the first door 104 and the second door 106. The right latching mechanism 114 associated with the tailgate seam 116 is used for latching the first door 104 and the left latching mechanism 114 associated with the tailgate seam 116 is used for latching the second door 106. The latching mechanisms 114 further include a bezel.

The embodiment of FIG. 1 includes two pairs of tailgate hinge kits 108. The first pair of tailgate hinge kits 108 is associated with the first door 104 and the second pair of tailgate hinge kits 108 are associated with the second door 106. The tailgate assembly 102 further includes a pair of tailgate cables 118 for supporting the tailgate in the open position. The first pair of tailgate cables 118 is associated with the first door 104 and the second pair of tailgate cables 118 is associated with the second door 106.

The tailgate seam 116 contains all of the necessary operational hardware for the first door 104 and the second door 106. The standard latching mechanisms 114 and the single handle levers 112 are used to open either the first door 104 or the second door 106 of the tailgate assembly 102. When either side is opened independently, the complementary side stays closed. Both sections of the tailgate assembly 102 open independently. Therefore, each tailgate latch 114 must be actuated in order to obtain full access to the cargo bed. If both tailgate section doors 104 and 106 are to be opened, the second section that is open engages the latching mechanism of the first section that is already opened, in the same manner as if both sections of the tailgate are in the closed position.

Once both tailgate sections are opened and coupled together, the first door 104 and second door 106 may close independently or as a single unit. In order to close the entire tailgate, the entire tailgate assembly 102 is lifted and closed as a single, coupled assembly. To close either the first door 104 or the second door 106 of the tailgate assembly 102 independently, the non-closing door is left open and the latches 114 associated with the open door of the tailgate assembly 102 that is to be closed are actuated by actuating the lever 112 associated with the door of the tailgate assembly 102 that is to be closed to disengage the latches coupling the tailgate section doors together and enable either door to be closed while the other door remains open.

The hinge assemblies 108 are associated with each of the bottom edges of the first door 104 and second door 106. The entire tailgate assembly 102 rotates on the hinge assemblies

108 located at the extreme left and extreme right of the tailgate assembly 102. The hinge assemblies 108 associated with the tailgate seam 116 remain engaged unless the above described method for closing the tailgate is used.

Figure 2:
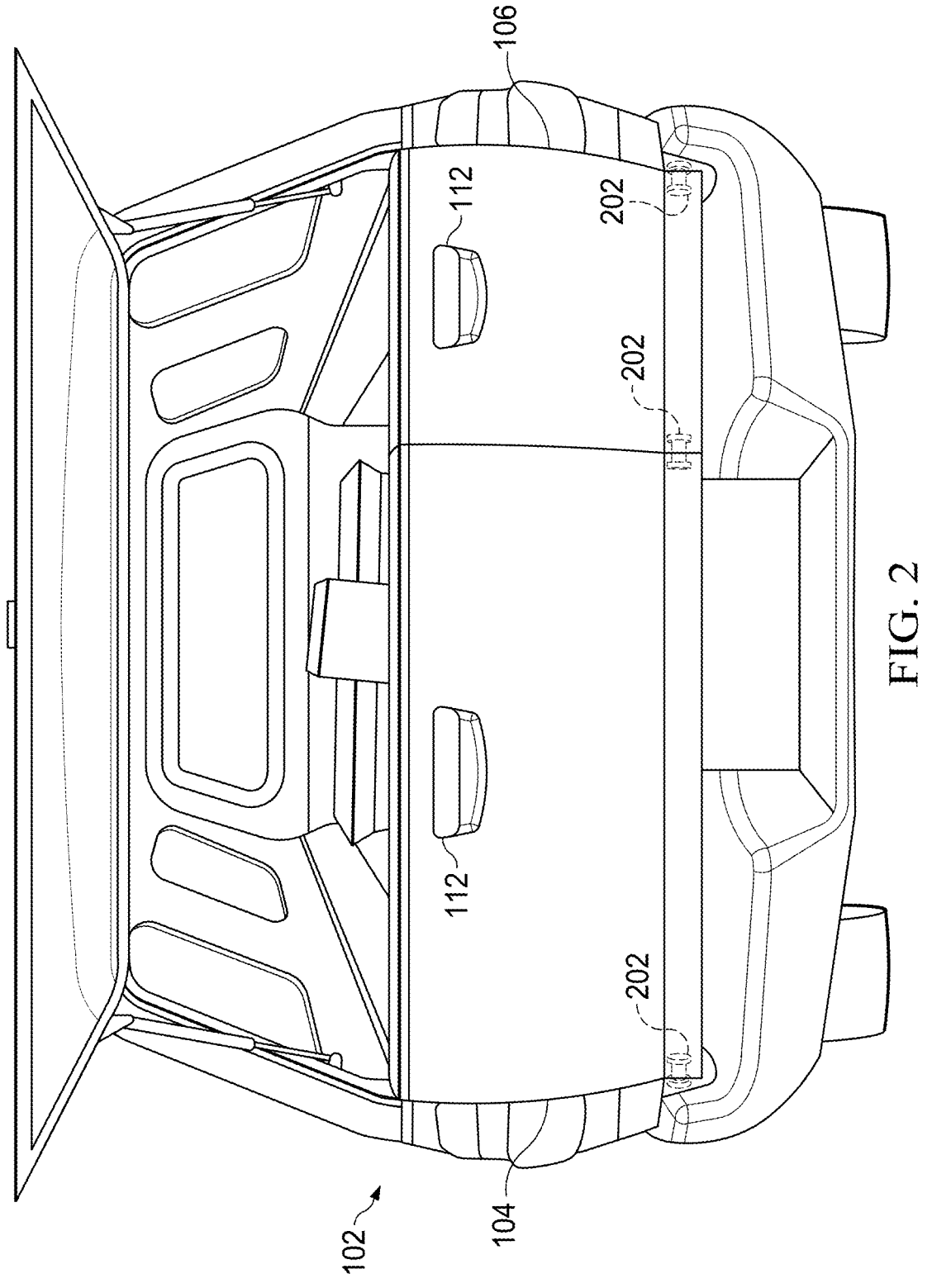
FIG. 2 illustrates the first embodiment of the multifunction vehicle storage compartment door with both doors in a closed position.
Figure 3:
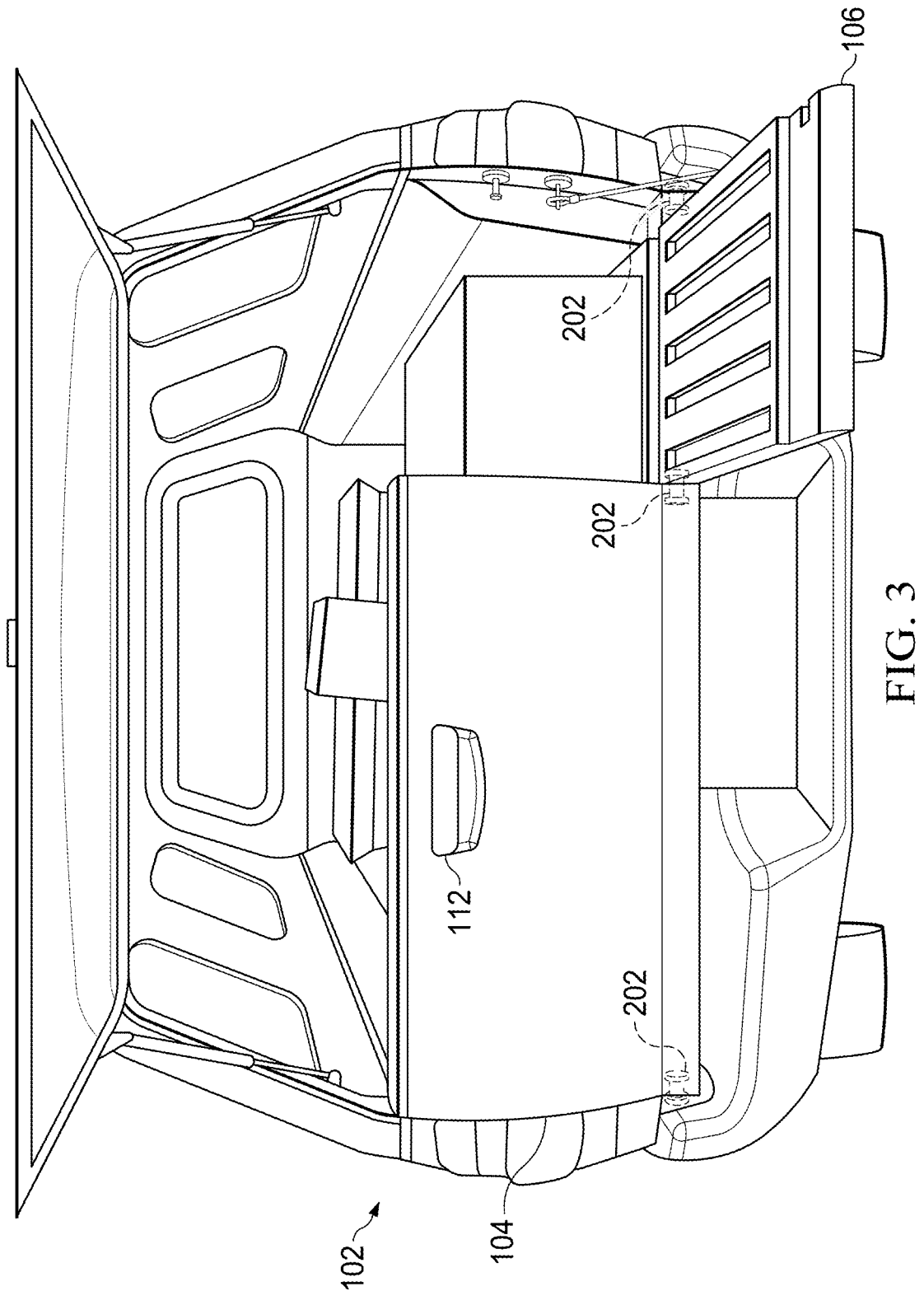
FIG. 3 illustrates the first embodiment of the multifunction vehicle storage compartment door with one door in a closed position and a second door in an open position.
Figure 4:
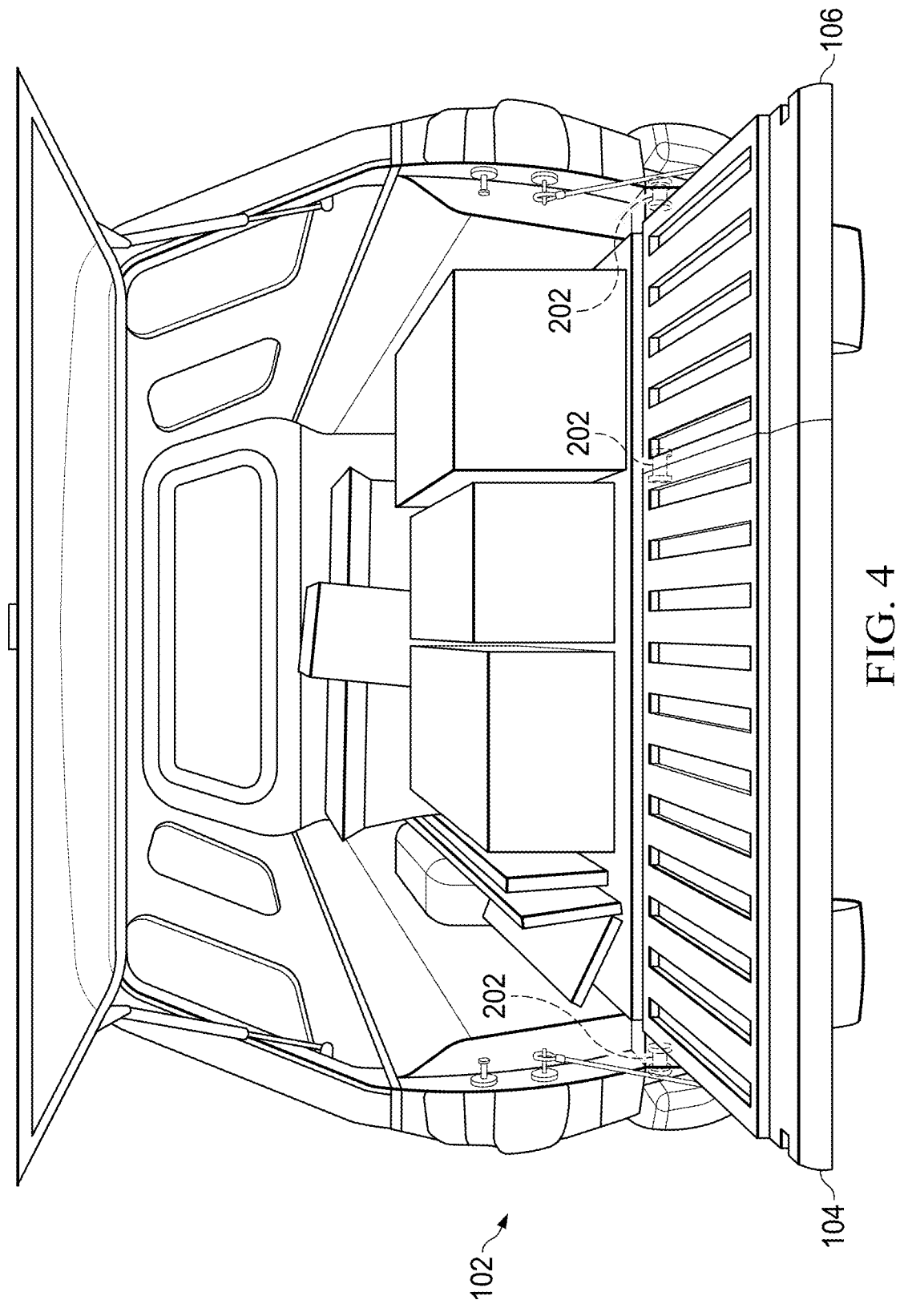
FIG. 4 illustrates the first embodiment of the multifunction vehicle storage compartment door with both doors in an open position.

Referring now to FIGS. 2-4, there are illustrated the various configurations of the tailgate assembly 102 wherein the first door 104 and the second door 106 are in differing open and closed positions. FIG. 2 illustrates the tailgate assembly 102 having both the first door 104 and the second door 106 in the close position to completely enclose an associated bed of a vehicle. The hinge assemblies 108 would be located generally at the positions 202 indicated in FIG. 2. The latch levers 112 are used for opening the first door 104 and the second door 106 either independently or together as described hereinabove. FIG. 3 illustrates the tailgate assembly 102 having the first door 104 in a closed position and the second door 106 in an opened position. FIG. 4 illustrates the tailgate assembly 102 having the first door 104 and the second door 106 both in the opened position.

Figure 5:
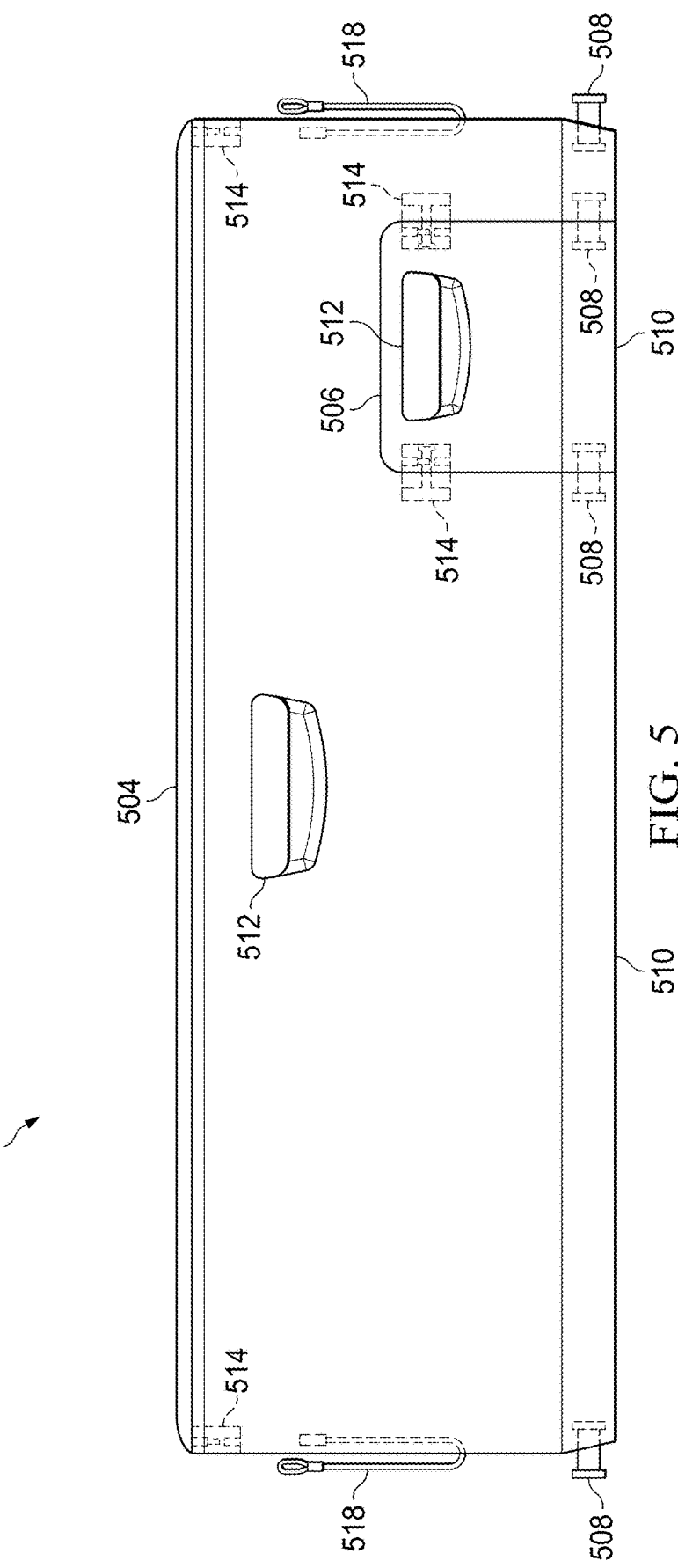
FIG. 5 illustrates a block diagram of a second embodiment of a multifunction vehicle storage compartment door.

Referring now to FIG. 5, there is illustrated a block diagram of a second embodiment of the tailgate assembly 502. A small second door 506 has its area within a larger area of a full size tailgate door 504 and allows long objects to extend through the small tailgate door 506 while the full-size tailgate door 504 remains in the closed position. This design allows the user to carry longer items which extend beyond the walls of the pickup truck bed while keeping a portion of the bed closed. This configuration prevents items from falling out of the back of the pickup truck bed while the truck is in motion. The tailgate assembly 502 is designed to include two separate opening portions of the tailgate assembly. A first door 504 comprises a largest portion of the tailgate assembly 502 and the second door 506 comprises a smaller portion of the tailgate assembly 502 defined within the bounds of the first door 504. The first door 504 and the second door 506 are connected to the vehicle and each other via hinge assemblies 508. The hinge assemblies 508 enable the first door 504 and the second door 506 to pivot along their edges 110 between the closed position and the open position. The tailgate assembly 502 further includes latch levers 512 for unlatching the first door 504 and the second door 506 from being latched into the closed position. Latching mechanisms 514 are actuated by the latch lever 512 to unlock the doors 504/506 from being held in the latched, closed position.

FIG. 5 illustrates a tailgate assembly 502 wherein the first door 504 and second door 506 open and close independently or wherein each of the first door 504 and second door 506 opens and closes as a single, full-size tailgate assembly. Two pairs of tailgate latch levers 512 are used for actuating the locking latches 514 and striker bolts for locking the first door 504 and the second door 506 into the closed positions. The first pair of locking latches 514 is used with the first door 504 and the second pair of locking latches 514 are used with the second door 506. The first door 504 has two latching mechanisms 514 associated therewith. The second door 506 located within the first door 504 also has two latching mechanisms 514 associated therewith. The latching mechanisms 114 further include a bezel.

The embodiment of FIG. 5 includes two pairs of tailgate hinge kits 508. The first pair of tailgate hinge kits 508 is associated with the first door 504 and the second pair of tailgate hinge kits 508 are associated with the second door 506. The tailgate assembly 502 further includes a pair of tailgate cables 518 for supporting the doors in the opened position. The first pair of tailgate cables 518 is associated with the first door 504 and the second pair of tailgate cables 518 is associated with the second door 506.

The standard latching mechanisms 514 and the single handle levers 512 are used to open either the first door 504 or the second door 506 of the tailgate assembly 502. When either door is opened independently, the other door stays closed. Both tailgate sections doors 504 and 506 open independently. The tailgate latch 514 of tailgate section door 504 must be actuated in order to obtain full access to the cargo bed. When the entire tailgate assembly 502 is in either an open configuration or closed configuration, the small tailgate door 506 follow suit with the larger tailgate door 504 as it is integrated with the full-size tailgate assembly 502. Under the circumstances, both the first door 504 and the second door 506 operate as a single unit. Lifting the latching mechanism 512 for the small tailgate door 506 disengages the small tailgate door 506 from the larger tailgate door 504. The small tailgate door then opens and closes independently of the large tailgate door 504.

Figure 6:
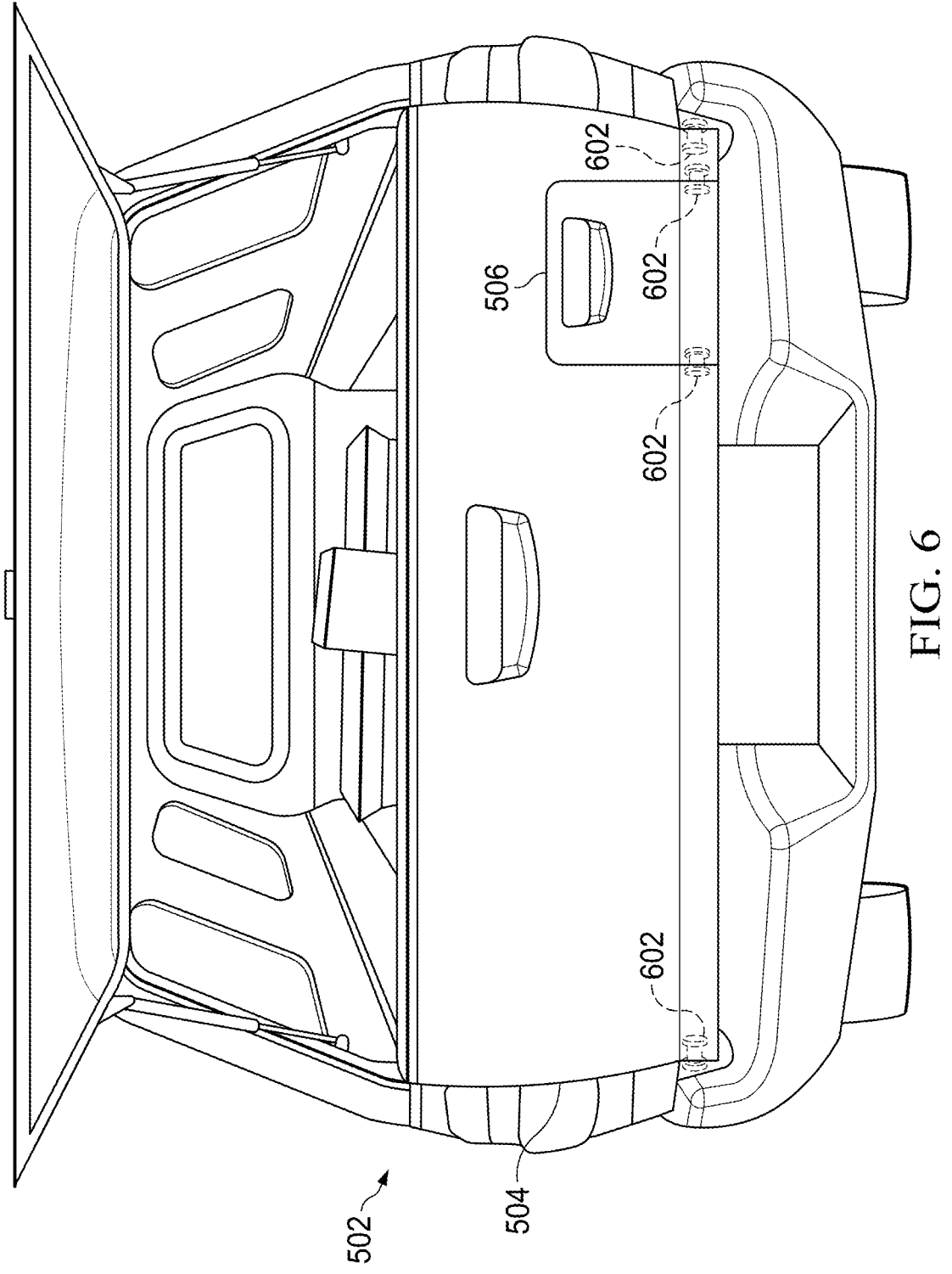
FIG. 6 illustrates the second embodiment of the multifunction vehicle storage compartment door with both doors in a closed position.
Figure 7:
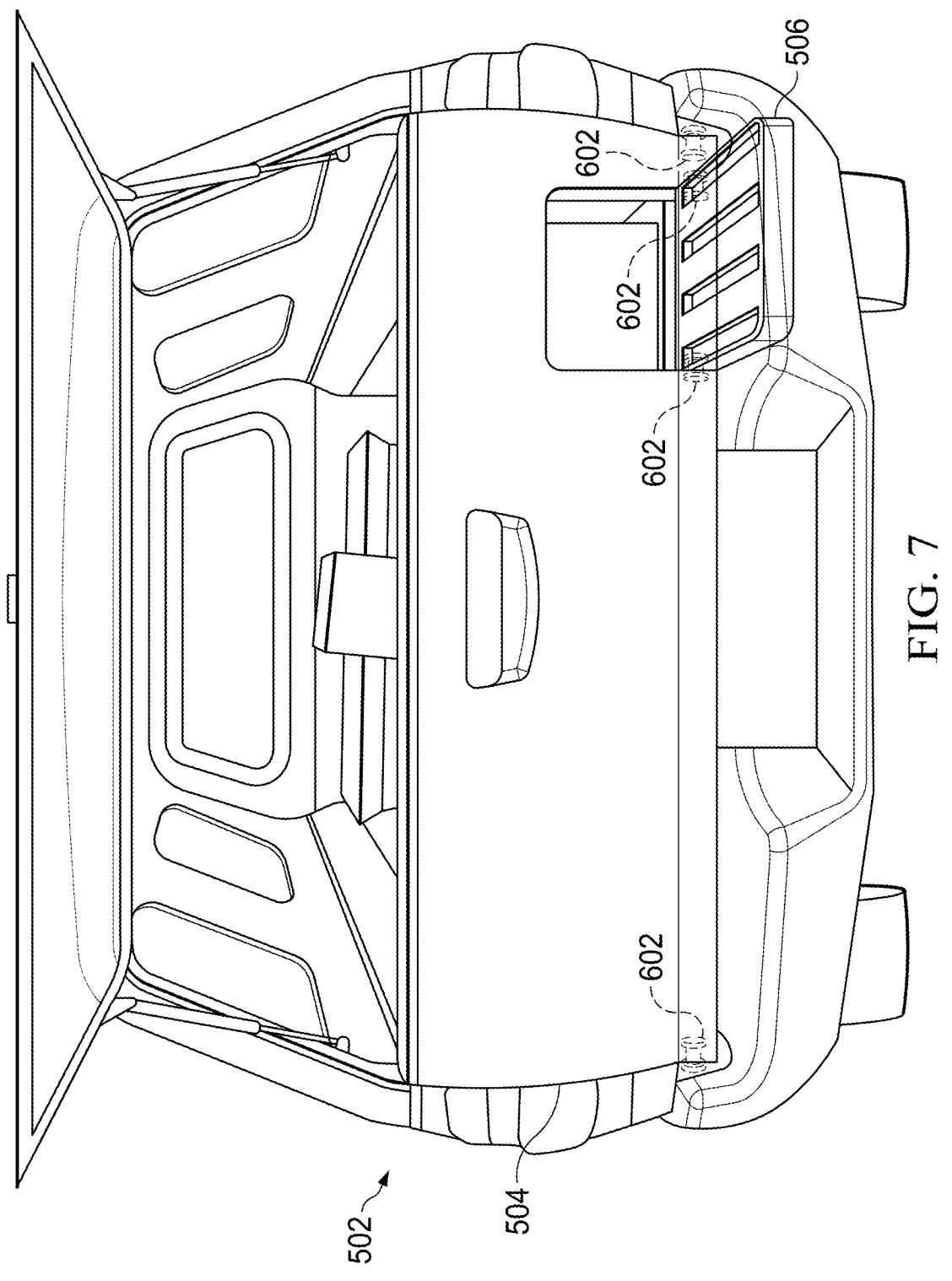
FIG. 7 illustrates the second embodiment of the multifunction vehicle storage compartment door with both doors in an open position.
Figure 8:
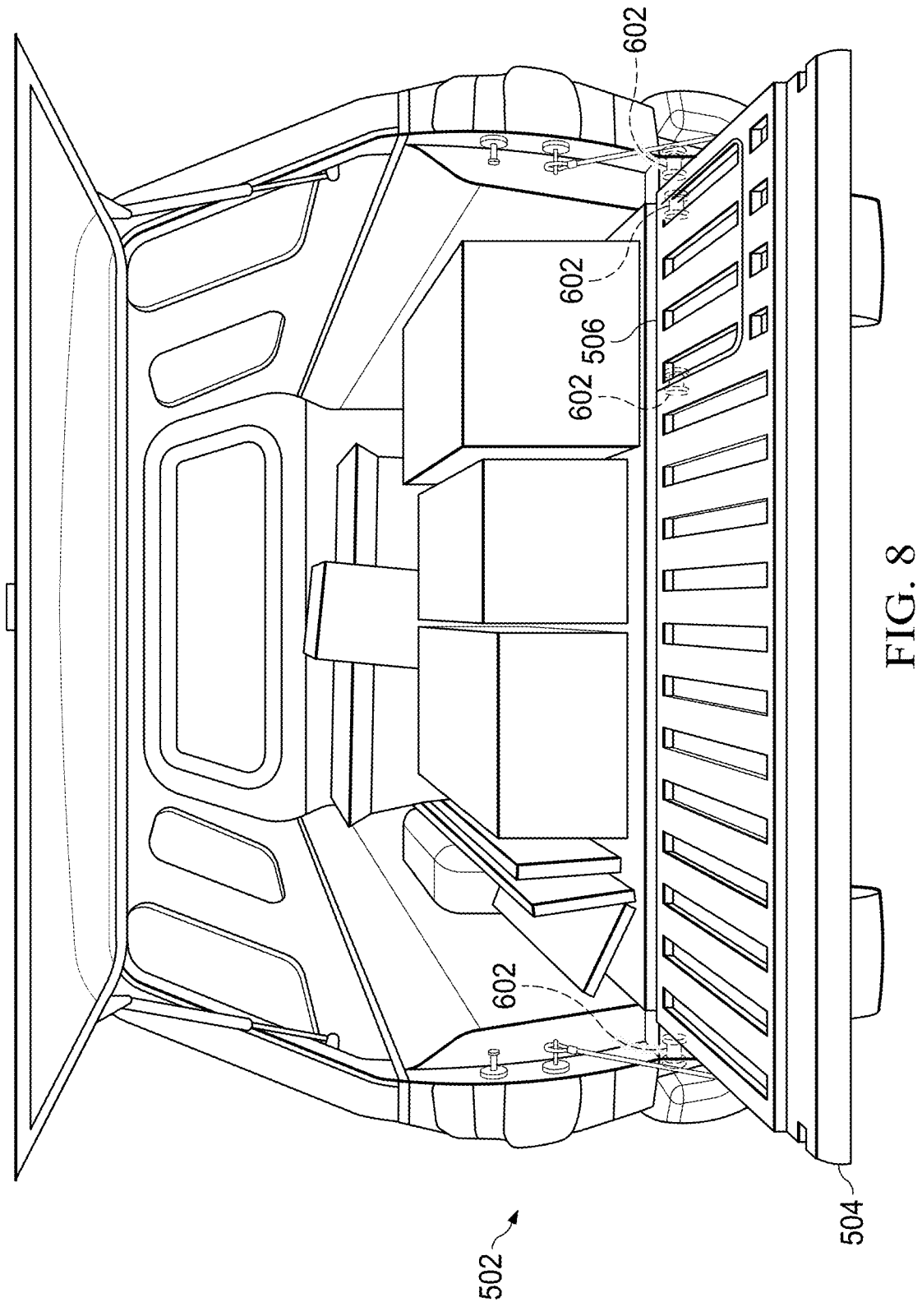
FIG. 8 illustrates the second embodiment of the multifunction vehicle storage compartment door with one door in a closed position and a second door in an open position.

Referring now to FIGS. 6-8, there are illustrated the various configurations of the tailgate assembly 502 wherein the first door 504 and the second door 506 are in differing open and closed positions. The hinge assemblies 508 would be located generally at the positions 602 indicated in FIG. 6. The latch levers 512 are used for opening the first door 504 and the second door 506 either independently or together as described hereinabove. Referring now to FIG. 6, the tailgate assembly 502 has both the first door 504 and the second door 506 in a closed position. The first door 504 and second door 506 can be opened using latch levers 512 as described hereinabove. Each of the first doors 504 and second door 506 would open and close on hinges located at positions 602 indicated generally in FIG. 6. FIG. 7 illustrates the tailgate assembly 502 with both the first door 504 and a second door 506 in the open position. FIG. 8 illustrates the tailgate assembly 502 with the first door 504 in the closed position and the second door 506 in the open position.

Figure 9:
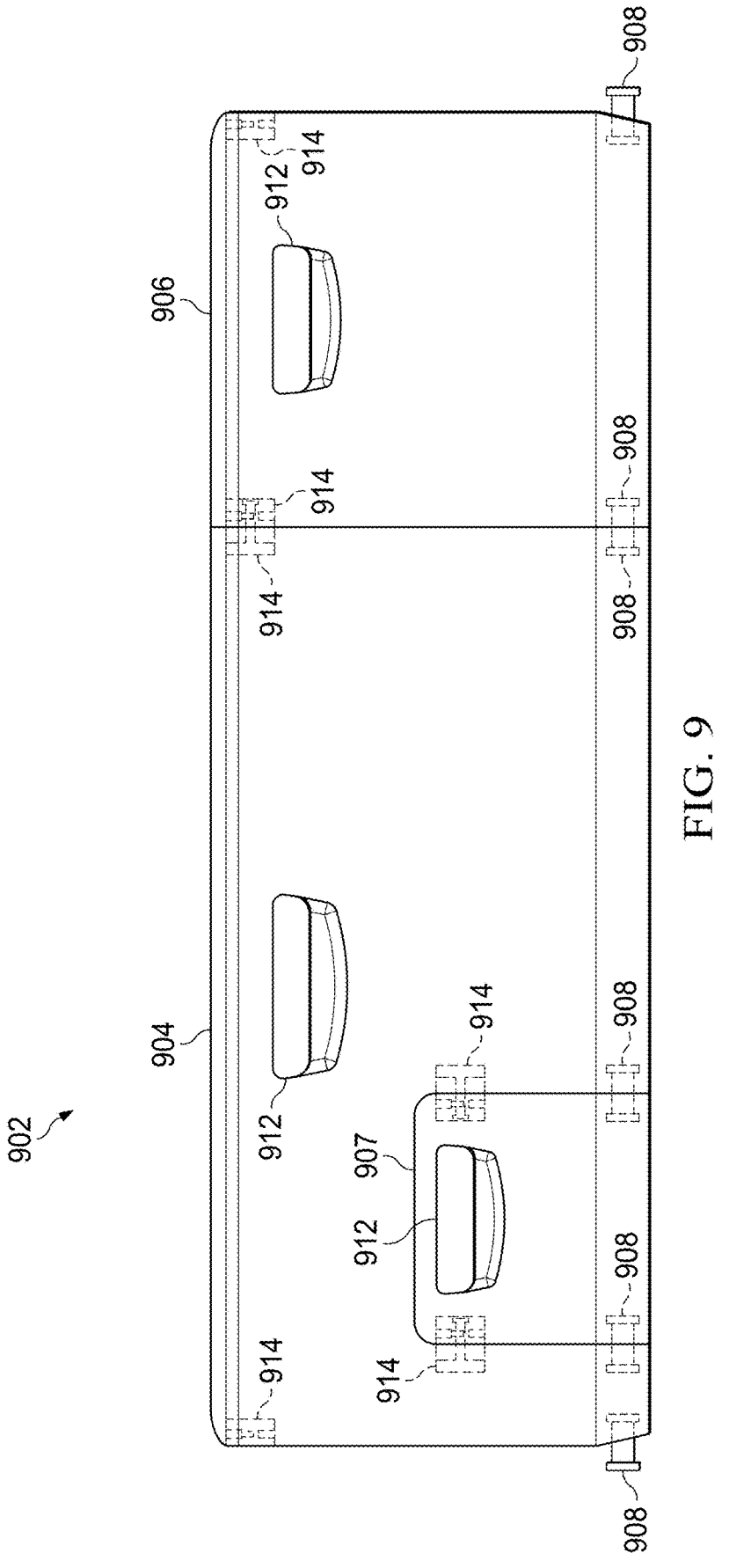
FIG. 9 illustrates a block diagram of a third embodiment of a multifunction vehicle storage compartment door.

Referring now to FIG. 9, there is illustrated a block diagram of a combination of the embodiments illustrated in FIG. 1 and FIG. 5. In this case, the tailgate assembly 902 consists of a first door 904 and a second door 906 that are each in a split configuration such as that described with respect to FIG. 1. A third door 907 is located within the area of the first door 904 in a manner similar to that described with respect to FIG. 5. Each of the doors would open and close about hinge assemblies 908 at points 1002 in the manner described hereinabove. The doors 904, 906 and 908 would be opened and unlatched using latch levers 912. Latch assemblies 914 would be used to latch the doors in the various positioning as discussed with respect to FIGS. 1 and 5.

Figure 10:
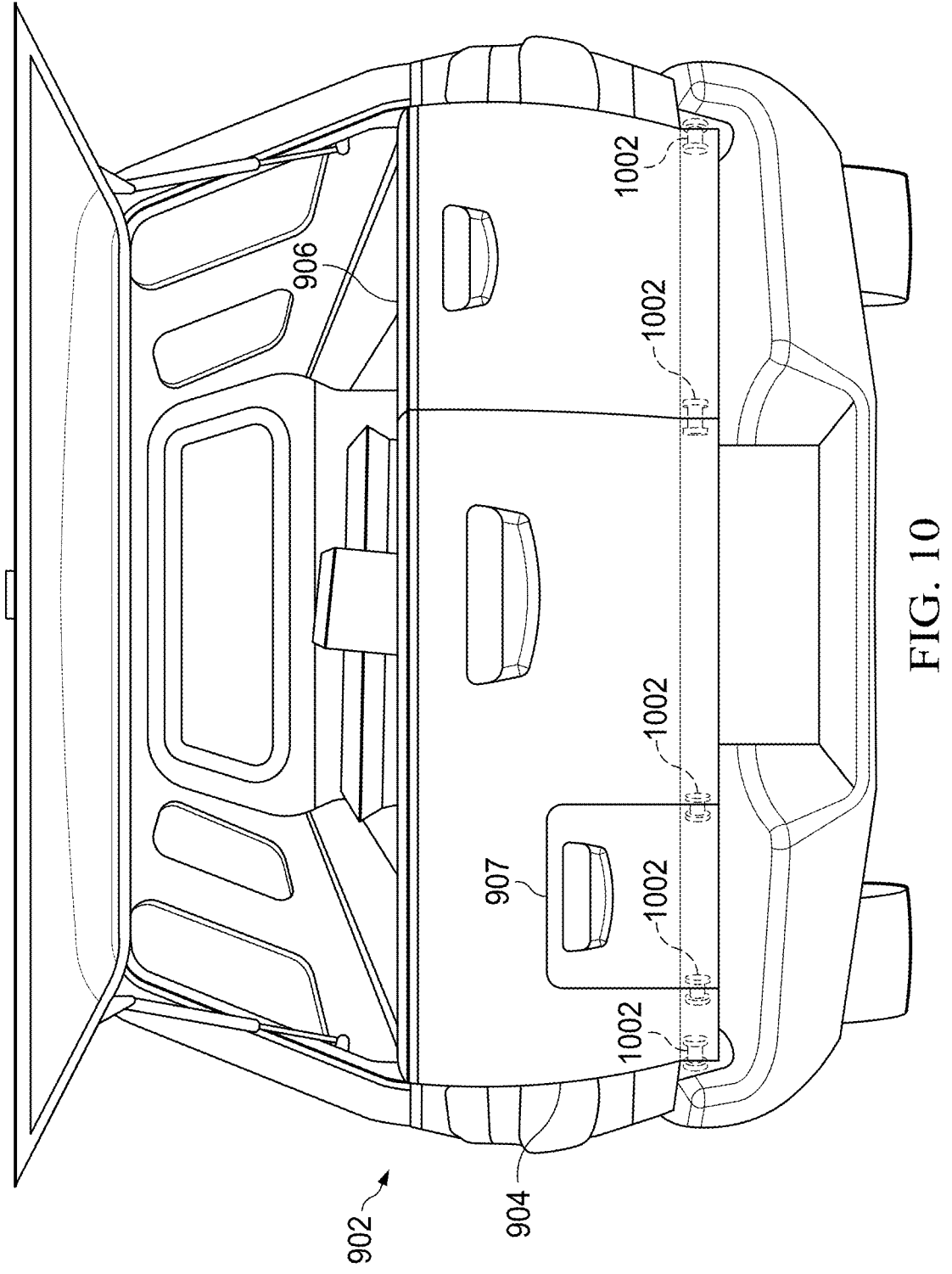
FIG. 10 illustrates the third embodiment of the multifunction vehicle storage compartment door with all three doors in a closed position.
Figure 11:
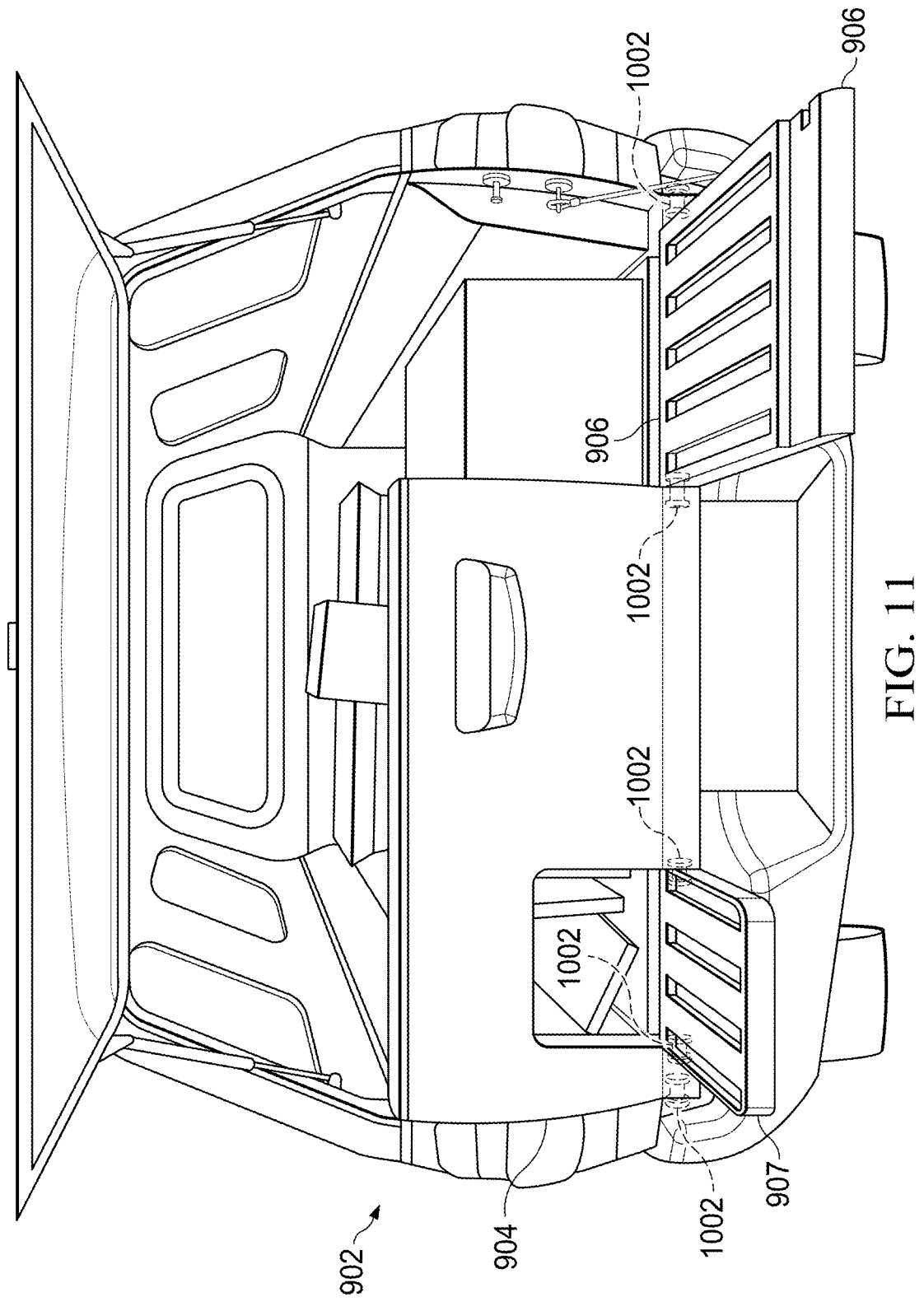
FIG. 11 illustrates the third embodiment of the multifunction vehicle storage compartment door having two doors in the open position and one door in the closed position.

With respect to each of the three doors 904, 906 and 907, any combination of open and closed positions are available using the above described methods and associated hardware for each door. These include having all doors closed, all doors opened, the small tailgate door 907 open with the split doors 904 and 906 both being closed (FIG. 10), the split door 906 being open with the small tailgate door 907 closed and the large tailgate door 904 closed with both the small tailgate door 907 and split tailgate door 906 being opened as illustrated in FIG. 11.

The embodiments disclosed hereinabove generally relate to automotive design. More particularly, for mechanisms used to engage/disengage a tailgate, hatchback or other vehicle trunk/lid assemblies. Embodiments of this disclosure provide alternative ways to access motor vehicles, particularly vehicle storage compartments in order to alleviate or otherwise reduce cargo size limitations. There are times when an item is too long to fit in the bed/back of a vehicle. In these cases, the drivers must ride with the tailgate open. Hatchback vehicle drivers ride with the hatchback in the up position. This disclosure sets out designs that allow for a portion of the tailgate or hatchback to be opened and accommodate longer objects while the remainder of the tailgate/hatchback can remain in the closed position.

It will be appreciated by those skilled in the art having the benefit of this disclosure that this multifunctional vehicle storage compartment door. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus for enclosing a storage area of a vehicle, comprising:

a first door enclosing a first portion of one side of the storage area and configured to pivot between an open position and a closed position along a bottom edge of the first door;

a second door enclosing a second portion of the one side of the storage area located within an area of the first portion below a top edge of the first door and between side edges of the first door, the second door configured to pivot between an open position and a closed position along a bottom edge of the second door, wherein the bottom edge of the second door aligns with the bottom edge of the first door;

a third door, located beside the first door for enclosing a third portion of the one side of the storage area that does not include the area of the first portion of the one side of the storage area;

a first pair of hinges associated with the first door, each of the first pair of hinges located at opposite ends of the bottom edge of the first door and enabling the first door to move between the open position and the closed position with respect to the first portion of the storage area;

a second pair of hinges associated with the second door, each of the second pair of hinges at opposite ends of the bottom edge of the second door and enabling the second door to move between the open position and the closed position with respect to the second portion of the storage area;

a first pair of latches associated with the first door for latching the first door into the closed position;

a second pair of latches associated with the second door for latching the second door into the closed position;

a first latching lever for releasing the first pair of latches latching the first door into the closed position; and a second latching lever for releasing the second pair of latches latching the second door into the closed position.

2. The apparatus of claim 1 further including:

a first pair of support cables for supporting the first door in the open position; and a second pair of support cables for supporting the second door in the open position.

3. The apparatus of claim 1, wherein the first door and the second door may open independently of each other in a first configuration and open together in a second configuration.

4. The apparatus of claim 1 further including:

a door seam for interfacing the first door and the third door;

wherein a first one of the first pair of hinges are associated with the door seam; and wherein a first one of the first pair of latches is associated with the door seam.

5. A tailgate assembly for enclosing a bed area of a pickup, comprising:

a first door enclosing a first portion of one side of the bed area of the pickup;

a second door enclosing a second portion of the bed area of the pickup different from the first portion, wherein the first door and the second door are located side by side to enclose the first portion and the second portion of the bed area of the pickup;

a third door having a third area located within an area of the first door;

wherein the first door and the second door may open independently of each other in a first configuration and open together in a second configuration;

a first pair of hinges associated with the first door, each of the first pair of hinges located at opposite ends of a first edge of the first door and enabling the first door to move between an open position and a closed position with respect to the first portion of the bed area of the pickup;

a second pair of hinges associated with the second door, each of the second pair of hinges at opposite ends of a first edge of the second door and enabling the second door to move between an open position and a closed position with respect to the second portion of the bed area of the pickup;

a third pair of hinges associated with the third door, each of the third pair of hinges at opposite ends of a bottom edge of the third door and enabling the third door to move between the open position and the closed position with respect to a third portion of the bed area of the pickup;

a first pair of latches associated with the first door for latching the first door into the closed position;

a door seam for interfacing the first door and the second door;

wherein a first one of the first pair of hinges are associated with the door seam;

wherein a first one of the first pair of latches is associated with the door seam;

a second pair of latches associated with the second door for latching the second door into the closed position;

a third pair of latches associated with the third door for latching the third door into the closed position;

a first latching lever for releasing the first pair of latches latching the first door into the closed position;

a second latching lever for releasing the second pair of latches latching the second door into the closed position; and a third latching lever for releasing the third pair of latches latching the third door into the closed position.

6. The tailgate assembly of claim 5, wherein the first door, the second door and the third door enclose the first portion, the second portion and the third portion of the bed area.

7. The tailgate assembly of claim 5 further including:

a first pair of support cables for supporting the first door in the open position;

a second pair of support cables for supporting the second door in the open position; and a third pair of support cables for supporting the third door in the open position.

8. A tailgate assembly for enclosing a bed area of a pickup, comprising:

a first door having a first area and enclosing a first portion of one side of the bed area of the pickup and configured to pivot between an open position and a closed position along a bottom edge of the first door;

a second door having a second area located within an area of the first portion below a top edge of the first door and between side edges of the first door enclosing a second portion of the one side of the bed area of the pickup, the second door configured to pivot between an open position and a closed position along a bottom edge of the second door, wherein the bottom edge of the second door aligns with the bottom edge of the first door;

a third door for enclosing a third portion of the one side of the bed area different from the area of the first portion, wherein the third door is located in an area next to the first door;

a first pair of hinges associated with the first door, each of the first pair of hinges located at opposite ends of the bottom edge of the first door and enabling the first door to move between the open position and the closed position with respect to the first portion of the bed area of the pickup;

a second pair of hinges associated with the second door, each of the second pair of hinges at opposite ends of the bottom edge of the second door and enabling the second door to move between the open position and the closed position with respect to the second portion of the bed area of the pickup;

a first pair of latches associated with the first door for latching the first door into the closed position;

a second pair of latches associated with the second door for latching the second door into the closed position;

a first latching lever for releasing the first pair of latches latching the first door into the closed position; and a second latching lever for releasing the second pair of latches latching the second door into the closed position.

9. The tailgate assembly of claim 8, wherein the first door, the second and the third door enclose the first portion, the second portion and the third portion of the bed area.

10. The tailgate assembly of claim 8 further including:

a first pair of support cables for supporting the first door in the open position; and a second pair of support cables for supporting the second door in the open position.

11. The tailgate assembly of claim 8, wherein the first door and the second door may open independently of each other in a first configuration and open together in a second configuration.

\* \* \* \* \*